Sept. 18, 1956  R. HAPPE  2,763,796
VENTILATING STRUCTURES FOR SMALL INSULATED INDUCTION MOTORS
Filed March 29, 1952  2 Sheets-Sheet 1

WITNESS
Nicholas Leszczok

INVENTOR.
Reynold Happe
BY
William P. Stewart
ATTORNEY

2,763,796

VENTILATING STRUCTURES FOR SMALL INSULATED INDUCTION MOTORS

Reynold Happe, Pittstown, N. J., assignor to The Singer Manufacturing Company, Elizabeth, N. J., a corporation of New Jersey Application March 29, 1952, Serial No. 279,278

3 Claims. (Cl. 310—62)

This invention relates to small induction motors having insulated covers and more particularly to structure for adequately self-ventilating such motors which are required to develop a large power output for a small volume of material.

A specific example of a motor of this type is illustrated and described in the copending U. S. patent application Serial No. 262,766 of Victor Rodzianko, filed December 21, 1951, now U. S. Patent 2,667,611, to which reference may be had for a more complete description thereof.

It is essential that motors of this type, for use in driving devices where the hands of the operator can readily come into contact therewith, have heat insulated covers to prevent accidental burns or near-burns. This requirement decreases the amount of heat that can normally be dissipated from the motor by radiation and thus adds to the heat which must be dissipated by convection, if the motor temperature rise is to be held to an acceptable value consistent with a reasonable insulation life.

It is therefore an object of this invention to provide improved construction for ventilating a small induction motor having insulated covers and without increasing the overall dimensions to secure said improvement.

This has been attained by a novel construction and control of the ventilating paths in which the stator core laminations are substantially completely exposed to the "scrubbing" action of the ventilating air on its way through the motor, and this, without weakening the mechanical structure of the motor.

With the above and other objects in view, as will hereinafter appear, the invention comprises the devices, combinations and arrangements of parts hereinafter set forth and illustrated in the accompanying drawings of a preferred embodiment of the invention, from which the several features of the invention and the advantages attained thereby, will be readily understood by those skilled in the art.

Figure 1:
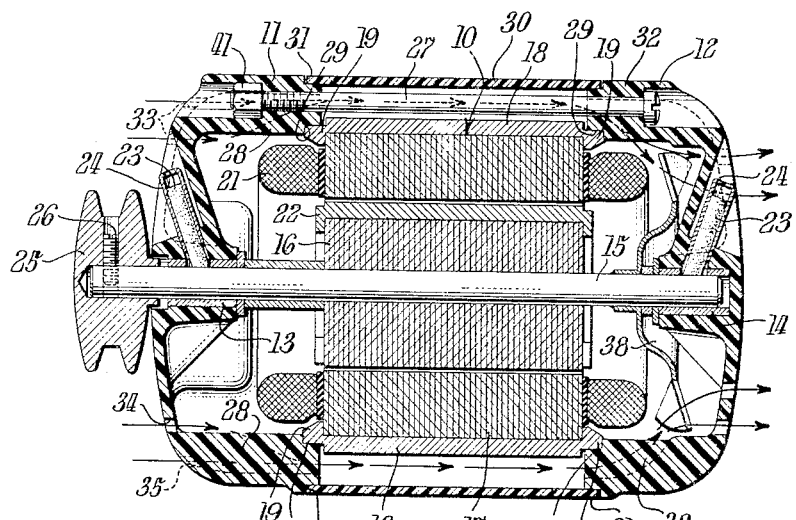
Figure 2:
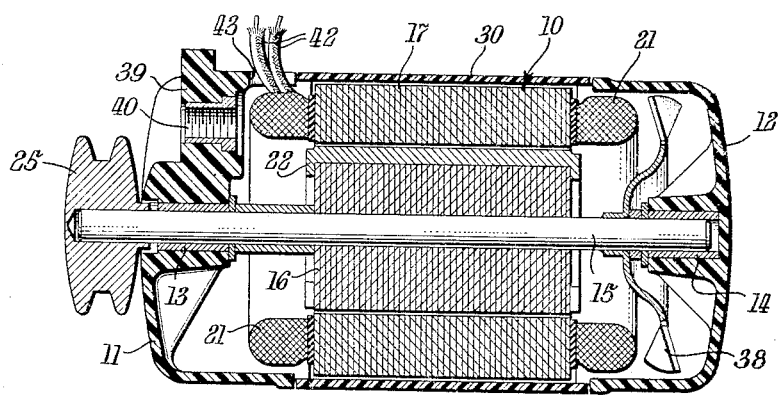
Figure 3:
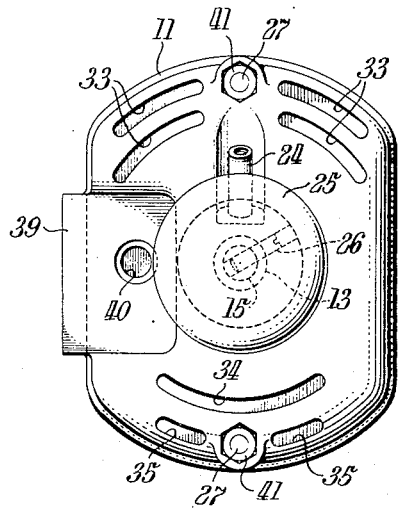
Figure 4:
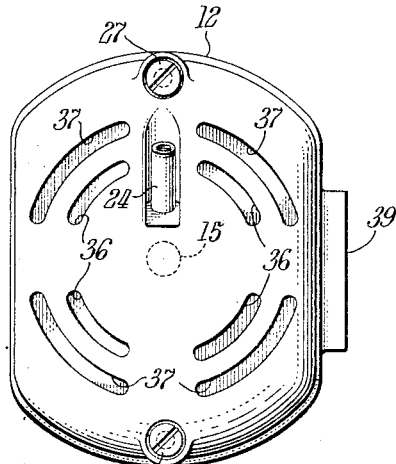
Figure 5:
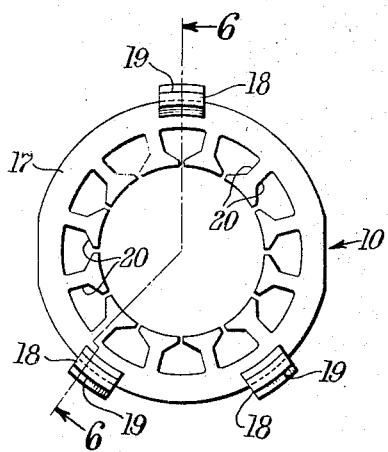
Figure 6:
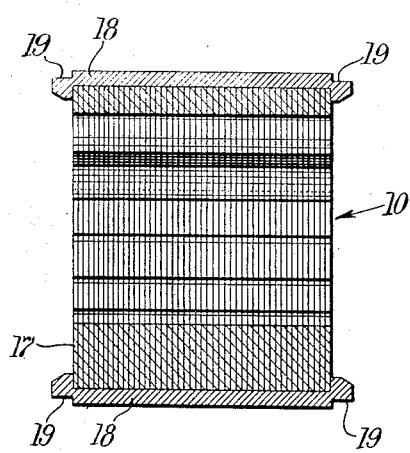

In the accompanying drawings Fig. 1 is a longitudinal sectional view of a motor embodying the invention. Fig. 2 is also a longitudinal sectional view taken at 90° from that of Fig. 1. Fig. 3 is an end elevation taken at the pulley end of the motor. Fig. 4 is an end elevation taken at the end opposite that of Fig. 3. Fig. 5 is an end elevational view of the stator core assembly of the motor. Fig. 6 is a longitudinal sectional view taken on line 6—6 of Fig. 5.

Referring to Fig. 1, the motor comprises broadly a stator core 10 held between end-covers 11 and 12 which are preferably formed of molded insulating material and which carry sleeve bearings 13 and 14 in which is journalled a shaft 15 carrying a rotor core 16. The stator core assembly itself is shown in Figs. 5 and 6 and comprises the annular laminations 17 stacked in face-to-face relation and held in this stacked condition by means of the circumferentially-spaced core-retaining strips 18 which extend longitudinally along the outer periphery of and beyond the ends of the stack. Preferably these strips are die-cast in position and are provided with external shoulders 19 for receiving the end-covers 11 and 12 in seated engagement therewith and spaced from the stator core, as most clearly shown in Fig. 1.

The stator core 10 is formed with longitudinal slots 20 which carry the stator windings 21 in a manner well known in the art. The rotor core 16 is also formed of stacked laminations with slots in which are carried the conventional die-cast squirrel-cage winding 22. Lubrication is provided by wick oilers 23—23 which are supported inside the cylindrical holders 24—24 secured to the respective end-covers 11 and 12. A pulley 25 secured to the external end of the shaft 15 by means of a screw 26 provides a convenient power take-off for belt-connected drives.

The end-covers 11 and 12 are, generally, thin-walled, dished elements provided with built-up sections or bosses wherever additional material is required, such as for accommodating the bearings 13 and 14, through-bolts 27 and nuts 41, and for providing a bearing surface or surfaces for receiving the stator core assembly. More specifically, with regard to the latter, the end-cover 11 is formed on the interior thereof with three bosses 28 spaced circumferentially to match the spacing of the three strips 18 of the stator core assembly of Fig. 5. The bosses 28 are each provided with a finished shouldered seat 29 for receiving the shoulders 19 of the strips 18, whereby the stator core is properly seated as a unit in the end-cover 11 as seen best in Fig. 1. It will be understood that the peripheral extent of each of the bosses 28 is limited and is the same as that of the retaining strips 18 of Fig. 5. This spaced arrangement of parts provides large openings communicating between the interior of the end-cover 11 and the generally annular space formed between the outer periphery of the stator core 10 and an insulated core-housing 30 seated against shoulders 31—31 in the respective end covers 11 and 12 as clearly shown in Fig. 1.

Similarly, the end-cover 12 is formed with three interior bosses 32 spaced circumferentially to match the strips 18 of the stator core assembly and in each boss is formed a finished seat 29 for receiving the shoulders 19 of said strips in the same manner as described above in connection with the end-cover 11, and with the result that large openings are provided for communicating between the region surrounding the stator core and the interior of the end-cover 12.

The end-cover 11 is provided with air inlet openings 33, 34, 35 and the end-cover 12 is provided with air outlet openings 36 and 37. A fan 38 secured to the shaft 15 causes a longitudinal circulation of cooling air through the machine as shown by the arrows of Fig. 1. A flat portion 39 is formed in the exterior surface of the end-cover 11 for receiving a mounting bracket which may be secured thereto by a screw (not shown) threaded into the insert bushing 40 secured in the end-cover. Leads 42—42 for connecting the windings 21 with an external circuit, are brought through a suitable side aperture 43 in the end-cover 11.

It will be seen from the above construction that the stator core assembly contacts the end-covers in a total of six places, each of quite limited extent, and it is therefore evident that not much heat can be transmitted by conduction through such contacts to thereby raise the temperature of the covers 11 and 12 and the associated housing 30. Thus, the outer surface is prevented from getting sufficiently hot to become hazardous to the user. At the same time, the construction according to the invention provides a stator core which is substantially exposed on all sides, and especially on the outer periphery, to the beneficial heat-extracting scrubbing of the ventilating air and in good volume due to a minimum of obstructions.

It will also be noted that a minimum of material need be employed in the core-retaining strips 18 due to the novel structure in which the end-covers form retaining rings for and thus reinforce the strips. This is an important consideration in keeping the region around the stator-core periphery as free as possible for adequate air flow and without unduly increasing the over-all dimensions.

As many different embodiments of this invention may be made without departing from the spirit and scope thereof, it is to be understood that I do not limit myself to the specific embodiment thereof except as defined in the appended claims.

Having thus set forth the nature of the invention, what I claim herein is:

1. In a dynamoelectric machine, a stator core of stacked magnetic laminations, longitudinal core-retaining strips positioned in spaced relation about the outer periphery and each formed with end portions radially overhanging the ends of said stator core to retain the laminations in stacked relation, a core-housing of molded insulating material, end-covers of molded insulating material formed with circumferentially-spaced internal shouldered seats for receiving the core-retaining strips, and external shouldered seats for receiving said core-housing, and recessed longitudinal fastening means for clamping said stator core and core-housing between said end-covers to form a fully insulated machine.

2. In a dynamoelectric machine, a stator core of stacked magnetic laminations, longitudinal core-retaining strips positioned in spaced relation about the outer periphery and each formed with end portions radially overhanging the ends of said stator core to retain the laminations in stacked relation, a core-housing of molded insulating material, and end-covers of molded insulating material, each formed with a boss portion for each of said core-retaining strips, each boss having an inner seat for receiving one end of each of said core-retaining strips, and an outer seat for receiving said core-housing.

3. In a dynamoelectric machine, a stator core of stacked magnetic laminations, longitudinal core-retaining strips positioned in circumferentially-spaced relation around the periphery of said core to hold said laminations together and having end portions extending beyond the ends of said laminations, end-covers formed of thin insulating material with thickened bosses spaced in register with said end portions and provided with seats for engaging and encircling said end portions to position said end-covers in longitudinally spaced relation with the end portions of the stator core and to leave therebetween large openings for the flow of air to and from the region adjacent the outer periphery of the stator core.

References Cited in the file of this patent

UNITED STATES PATENTS

| | | |
|---|---|---|
| 1,822,859 | Perkins | Sept. 8, 1931 |
| 1,936,744 | Adams | Nov. 28, 1933 |
| 2,367,428 | Divi | Jan. 16, 1945 |
| 2,411,684 | Hamilton | Nov. 26, 1946 |

FOREIGN PATENTS

| | | |
|---|---|---|
| 60,436 | Netherlands | Jan. 15, 1948 |
| 137,566 | Switzerland | Mar. 17, 1930 |
| 352,018 | Great Britain | June 29, 1931 |